United States Patent [19]
Nilsson

[11] Patent Number: 6,085,110
[45] Date of Patent: Jul. 4, 2000

[54] ARRANGEMENT AND METHOD IN A MOBILE COMMUNICATION SYSTEM FOR SELECTING A COMMUNICATION ARRANGEMENT

[75] Inventor: Patrik Nilsson, Landskrona, Sweden

[73] Assignee: Telefonaktiebolaget LM Ericsson, Stockholm, Sweden

[21] Appl. No.: 08/980,718

[22] Filed: Dec. 1, 1997

Related U.S. Application Data

[63] Continuation of application No. PCT/SE96/00657, May 21, 1996.

[30] Foreign Application Priority Data

Jun. 1, 1995 [SE] Sweden .................................. 9502003

[51] Int. Cl.[7] .................................................. H04B 7/005
[52] U.S. Cl. ........................... 455/552; 455/434; 455/553
[58] Field of Search ................................ 455/552, 166.2, 455/432, 553, 440, 434, 515, 550

[56] References Cited

U.S. PATENT DOCUMENTS

| | | |
|---|---|---|
| 5,159,625 | 10/1992 | Zicker . |
| 5,261,117 | 11/1993 | Olson . |
| 5,355,517 | 10/1994 | Olson ..................................... 455/166.2 |
| 5,504,803 | 4/1996 | Yamada ..................................... 379/59 |
| 5,613,204 | 3/1997 | Haberman et al. ..................... 455/54.1 |
| 5,613,213 | 3/1997 | Naddell et al. ......................... 455/54.1 |
| 5,734,980 | 3/1998 | Hooper et al. ........................... 455/434 |
| 5,784,693 | 7/1998 | Barber et al. ............................ 455/551 |
| 5,832,367 | 11/1998 | Bamburak et al. ...................... 455/434 |
| 5,839,069 | 11/1998 | Keshavachar et al. ................. 455/434 |
| 5,903,832 | 5/1999 | Seppanen et al. ...................... 455/552 |

FOREIGN PATENT DOCUMENTS

| | | |
|---|---|---|
| 563 898 | 10/1993 | European Pat. Off. . |
| 603 049 | 6/1994 | European Pat. Off. . |
| 250310 | 7/1996 | New Zealand . |
| WO92/08325 | 5/1992 | WIPO . |

*Primary Examiner*—Edward F. Urban
*Assistant Examiner*—Tilahun Gesesse
*Attorney, Agent, or Firm*—Burns, Doane, Swecker & Mathis, L.L.P.

[57] ABSTRACT

A mobile communication unit, e.g., a telephone, which can be connected to primary and secondary communication arrangements such as networks, systems having different standards, or different frequency bands includes devices for searching, selecting, and connecting to the primary and secondary communication arrangements and further includes a user interaction device so that the user can accept and/or reject connections and so that the user is aware of which arrangement is used. The invention also relates to a method for selecting the connection arrangement for a mobile communication unit.

35 Claims, 2 Drawing Sheets

ARRANGEMENT AND METHOD IN A MOBILE COMMUNICATION SYSTEM FOR SELECTING A COMMUNICATION ARRANGEMENT

This application is a continuation of International Application No. PCT/SE96/00657, filed May 21, 1996, which designates the United States.

BACKGROUND

The present invention relates to a mobile communication unit such as e.g. a telephone for which a network has to be selected to which the unit is to be connected. The mobile communication unit, or particularly the telephone, comprises at least a first and a second mode of which one may be a manual mode and the other an automatic mode. Interaction means are provided through which interaction with the user is enabled and which is applied at some stages in a selection process.

The invention also relates to a method for connection of a mobile communication unit such as e.g. a telephone to a network. Still further the invention relates to a mobile communication system in which a number of mobile communication units are compatible with a number of networks within the system and in which the selection of network is done.

In an analogous way the invention also relates to a mobile communication unit which can be connected to systems of different standards or which can be used in different frequency bands.

Similarly the invention relates to a method of connecting a mobile communication unit wherein these options are available.

A number of network selection methods are known today but none of them is really satisfactory for a number of reasons.

Known GSM (Groupe Special Mobile) telephones can be set in two different network modes. One mode relates to an automatic search mode and the other is a manual search mode. If the automatic search mode is selected, the telephone is automatically changed to the network having the best conditions. If however the manual search mode is selected, connection is maintained to the network that was tuned to until the user actively changes the settings. Search mode is selected and set manually via for example a telephone network menu.

A problematic situation arises with a telephone of the above mentioned kind if the telephone is used in the vicinity of a border between two (or more) countries. If the conditions relating to the home network are not good, or not the best in relation to other accessible networks, the telephone is switched over to a foreign network if the automatic search mode was set. If a user is not used to this situation or is not aware of it, the situation arises that for example the home country can not be reached without a national code being dialled. This means that if for example a Swedish user makes telephone calls from his Swedish telephone when he is in the vicinity of the Danish border, he might have to call 0046 (the national code of Sweden) in order to reach Sweden and possibly he is not aware of this fact or he might not know of the national code etc. Moreover this situation may change frequently if he stays in the region of the border for some time since the best connection with the network varies making this situation even more complicated. Further still, if a Swedish subscriber, even when in Sweden, in a situation as discussed above, is connected to e.g. a Danish network the charges will be higher, since generally the charges of the home network are the least. This is very unsatisfactory to the subscribers.

Therefore it is frequent that the user sets the telephone in the manual search mode. However, this gives rise to complications when the user goes abroad since then he does not know how to change it. Such occurrences may consequently cause quite a lot of confusion to a user and may even restrict the use of mobile telephones both for a particular user and in more general terms.

Moreover, the situation may grow even more complicated in the future. In the GSM-system, which here is given merely as an example, it is presently not possible to roam between networks within one and the same country. This means that if for example there are two or more networks within one and the same country (operated by different operators), it is not possible to roam between these networks. It is only possible to roam between networks in different countries, thus it is possible to roam from a first network operated by a first operator in one country to another network operated via second operator in another country.

Generally an operator of a first country may have concluded an agreement with a specific operator in a second country so that when the second network, i.e. the network in the second country, can not be reached or has a bad quality or anything the like, the user may select and connect to a third network operated by still another operator in the second country if such can be reached, has a better quality, or for some other reason is more attractive.

However, it has been proposed for the new PCS-PCN standards, (for instance DCS 1800 which is an enhanced GSM system at 1800 MHz) that roaming be enabled between networks belonging to different operators within one and the same country as well.

In DCS 1800 the operator of a network to which a user subscribes, denoted the first network, may conclude an agreement with other operators of other networks (which of course have to be compatible) denoted second networks, according to which the user may select and connect to a second network if the first network is not reachable or has a bad quality or similar and if the second network is reachable or has a superior quality or similar.

However, the situation may arise that the best network according to some given standards is not the one preferred by the user for different reasons. One reason may be that one network is preferable because it is cheaper even if the quality is somewhat lower but still acceptable or the home network may be preferred if it still works although it does not at the moment have the same quality as some other network.

U.S. Pat. No. 5,261,117 relates to the selection of radio system when a system selected by the operator can not be found. The selection of an alternative system thus will take place automatically with the use a of priority list. Periodical attempts are done to return to the system selected by the operator. Moreover periodical attempts are done in order to connect to the highest possible system on the priority list. The user can also choose not to use the automatic searching. However, this system is quite complicated and it does not facilitate the use of the telephone for a user who for example is close to a border between countries so that the user easily can obtain knowledge about in which network he is and to control this. In another document, U.S. Pat. No. 5,159,625, it is stated that conventional cellular mobile telephones can use any of a number of different programable selection methods to select which cellular system to be used for communication. Whereas selection processes of this kind for example may consist of only selecting one system or that one system is preferred but if this is not accessible, another can be used etc. Furthermore, it is possible to only use the home system. Usually the telephone also comprises a default process which can be changed by a user. However, in practice the user will not do so to a great extent since it is too complicated. According to the document it is difficult for a user who is roaming to, in an appropriate way, select a foreign network. This document therefore gives a method according to which the telephone selects a set of frequencies to be used for communication. Furthermore the telephone stores a list of system identification numbers which gives the cellular systems not to communicate with. The telephone detects and displays while roaming and during roaming the telephone gets a system identification number relating to the system which can be used for communication. This foreign system is selected according to a system selection process and it communicates on a first frequency group. Then the telephone checks the system identification number of this foreign system with a list on numbers and if it is identified on the list, the telephone shall communicate on a second set of frequencies. Also this method is complicated and not user-friendly.

Dual mode telephones are known which can be connected to two different system standards (c.f. AMPS-D-AMPS; Advanced Mobile Phone System; Digital AMPS). Moreover, dual mode telephones are known which can connect to different frequency bands, c.f. TACS (Total Access Communication System). However, the similar objects and needs as discussed above in relation to network selection are also not fulfilled in any of these selection cases.

SUMMARY

It is therefore an object of the present invention to provide for a mobile communication unit with which the selection of network/system standard/frequency band is simplified. It is also an object of the invention that a subscriber, without having a deeper knowledge or technical understanding, easily can handle the telephone irrespective of where the user is, for example if he is close to a border or whatsoever. It is also an object to make mobile communication, particularly mobile telephony, as easy and user-friendly as possible.

A particular object of the invention is to facilitate the handling for a user who for example wants to use the telephone in the vicinity of a border between different countries in such a way that he is aware of in which network he is, i.e. which network is used, if he needs to dial a country code or not and to enable his selection of the desired network. Another particular object of the invention is to facilitate the situation when more than one network are accessible to a user in general, for example also within a country, so that the user can select network and/or be aware of which network the communication unit is connected to. It is also an object of the invention to make the selection of network easy and flexible irrespectively of the actual location of the mobile communication unit, e.g. a telephone.

It is also an object of the present invention to provide a method for network selection which is easy for a user to understand and which is also transparent to the user so that he all the time easily can find out or knows which network is used and so that he can influence the selection of network.

Still a further object of the invention is to provide a mobile communication system, in which a number of networks operated by the same or different operators and comprising a number of mobile communication units which are compatible with more than one network, wherein the selection of network is easy and transparent to a user and can be influenced by the user.

Although the objects have mainly been discussed under reference to network selection it should be clear that the same considerations apply to selection of system (having different standards) and to selection of frequency band etc. I.e. it is the purpose (among others) to give the user the possibility of controlling the situation, e.g. the selection of network/system standard/frequency band and thus have knowledge of what is used and to be able to choose what is most convenient e.g. for economical, practical or any other reasons he may have.

These as well as other objects are achieved through a mobile communication unit as initially referred to in which interaction means are provided by which a user interaction is enabled so that the user at given occasions can accept and/or reject a found network/system/frequency band. Particularly the mobile communication unit comprises a manual mode and an automatic mode and if a primary network/system/frequency band is indicated (directly or indirectly e.g. via subscription), and a mobile communication unit is activated, this network etc. is automatically selected, if found. Particularly the primary network/system/frequency band is only automatically selected if a mobile communication unit is activated and it is in a manual mode. If the unit on the other hand is in an automatic mode and the primary arrangement is found, it is only automatically selected if no other arrangement can be found. Arrangement here means network, system of a given standard or frequency band. If another, or secondary arrangement, is also found, the user is asked whether the primary arrangement shall be selected and if he confirms that the primary arrangement shall be selected, a mode switching is automatically carried out from the automatic mode to the manual mode. If on the other hand, according to a particular embodiment, the mobile communication unit is in a manual mode and the primary arrangement (or any primary arrangement) is not found, the user is asked a given number of times during an activation period of the mobile communication unit if it is accepted that a secondary network be selected. With activation time or activation period is here meant the period between switching on and switching off the mobile communication unit. After having been switched off and when it is switched on again, a new activation period commences and the same question can be asked the same number of times again. Particularly the question is only asked once during one activation period unless a connection is lost or a mode switching has been carried out inbetween. Particularly, if the automatic mode is used and both the primary or particularly the home arrangement and another arrangement (network) (secondary) is found, the user is asked once (or any other predetermined number of times) if the home network is to be selected. If yes, a mode switching from automatic mode to manual mode occurs automatically.

If the manual mode is used and the primary arrangement (or particularly the home network) is not found or if the primary arrangement or particularly the home network had been selected and connected to but thereafter been lost, a search for another arrangement is carried out, and if such is found, the user is asked whether a secondary arrangement can be selected, or particularly a foreign network, can be selected. This question is also asked only a given number of times, particularly only one time, and if the answer is yes, the secondary arrangement or e.g. the foreign network is selected.

In a particular embodiment, a continuous search for a primary arrangement or particularly a home network is carried out continuously over the given frequency.

The objects are also achieved through a method for selecting connection network/system standard/frequency band for a mobile communication unit such as e.g. a telephone. Hereinafter if only referred to "network", it should be clear that it likewise applies to systems of different standards, e.g. a primary and a secondary standard and to different frequency bands, e.g. a primary and a secondary frequency band. The communication unit comprises user interaction means and the method comprises the steps of searching for accessible networks, examining if a primary network is found (a primary network has a higher priority than a secondary network). If a primary network is found, particularly if only a primary network is found, this primary network is automatically selected. If no primary network is found, the user is via the interaction means asked if a selection of a secondary network is acceptable. If the answer is yes, a secondary network is selected. If the answer is in the negative, the search for a primary network proceeds. Particularly interaction of the user only takes place a limited number of times during an activation period of the mobile communication unit and even more particularly only once per category of answer which for example means that if a user has indicated once that it is not accepted to use a secondary network, the mobile communication unit will not further ask the same question during the activation period, and once indicating that it is preferred to remain in a secondary network although a primary has been found.

BRIEF DESCRIPTION OF THE DRAWINGS

The invention will in the following be further described in an non-limiting way under reference to the accompanying drawings in which.

DETAILED DESCRIPTION

Figure 1:
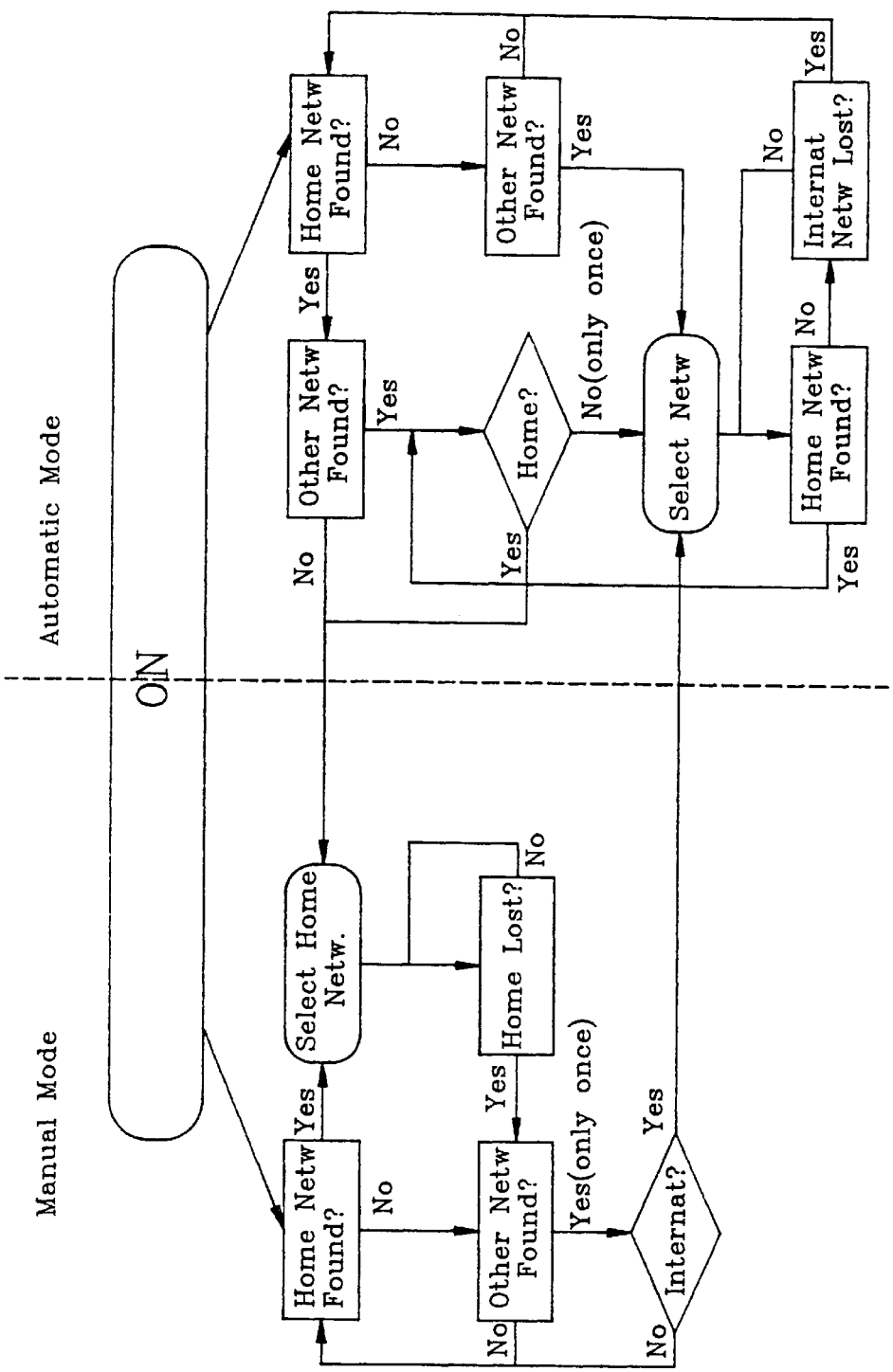
FIG. 1 illustrates a flow diagram relating to one embodiment of the invention, and FIG. 2 very schematically illustrates communication between different units within a mobile communication unit.

A first embodiment of the invention will now be more thoroughly explained. This embodiment relates to a home network and foreign networks. The embodiment therefor explains the situations when a user is in his home country and when the user is abroad respectively. Although the embodiment is more thoroughly discussed in relation to home networks and international networks it is of course applicable to the more general sense of primary networks and secondary networks in which case a home network is to be seen as a primary network whereas a foreign network or "going international" relates to connecting to a secondary network.

In a first situation, the user (subscriber) is in the home country (more generally the user is within the coverage of a primary network or the home network). In this embodiment the mobile communication unit is a mobile telephone.

When the telephone is switched on in the home country, a search is done to find the home network. If the home network is found, the telephone is automatically set to manual search mode. If on the other hand the home network can not be found, a search is done to see if any other network can be found. If such is found an interaction takes place with the user. In this advantageous embodiment it is simply asked "international?". Although not further described here there are of course a number of different possibilities to provide for interaction with the subscriber/user to find out if he accepts a foreign network or an international network. However, in this case the word "international?" is shown on the display and the user may for example confirm by pressing a key or disagree by pressing a key etc. If the user accepts an international connection (generally a secondary connection) or if the user declares himself ready to accept foreign networks and indicates this via the interaction means, the automatic mode switching from manual search mode to automatic search mode takes place. If however the user rejects to connect "international", i.e. does not accept to be connected to a foreign network, for example a button or a key is pressed indicating "no", and the manual search mode is maintained and the search for the home network is continued.

If the connection with the home network is lost and if one or more other networks are found, the telephone will ask "international?" and an answer in the affirmative will, as above, lead to an automatic mode switching from manual mode to automatic mode. A negative reply, however, has as a consequence that the manual search mode is maintained and there will be no further asking about "going international" until the telephone is restarted. This is to avoid that the telephone for example asks "international?" more or less repeatedly when the user is close to a border between countries or generally in an area where more than one (compatible) network are accessible.

If the user is abroad and the telephone is in manual search mode when it is switched on (if for example the telephone had been switched off in the home country) it works as follows:

If the home network is not found but an international network can be found, the telephone asks "international" as explained above and if the user accepts the selection of a foreign network, such is selected.

If on the other hand, when the telephone is in an automatic search mode when it is switched on, which for example may be the case if a user has already used the telephone abroad, it works as follows:

If both the home network and one or more international networks are found, the telephone requests information on whether the user wants to be connected to the home network. This will in the particular embodiment be effected through asking "home net?". If the user confirms that he wants to be connected to the home network, automatic switching of modes to the manual search mode takes place.

If however only the home network is found, there is an automatic mode-switching to the manual search mode without asking the user any questions. Of course the interaction with the user can be organized in any convenient manner and the questions, the way the questioning is done etc. is arbitrary as long as the message involves accepting and/or rejecting secondary and/or primary networks as described in the present document.

However, the embodiment referred to above is illustrated in the flow diagram of FIG. 1. From there it can be seen that if the telephone is switched on in a manual mode, a search is done for the home network. If the home network is found, this is selected. If the home network is lost, a search for other networks is done. If no other network is found, it keeps searching for the home network, or if it is found, it is selected in a manner as described above. If however some other network is found when the home network is lost—or if it was not found from the beginning—the user is asked if he accepts an international connection. A negative reply makes the search for the home network continue. "Yes" results in an automatic mode switching from manual mode to automatic mode and the found network is selected. The situation when a foreign network has been selected will be described below when the switching on of the telephone in an automatic mode is discussed. The procedure is the same.

If thus the telephone is switched on in an automatic mode, a search for the home network is done. If the home network is found, a search is done for other networks. If no other network is found, an automatic mode switching takes place from automatic mode to manual mode and the home network is selected and the procedure as described above under reference to the manual mode is continued. Of course a search for other networks is done also when the home network (primary network) is not found.

If however at least one other network is also found (in addition to the home network), the user is asked if he wants to connect to the home network. If the user indicates that he wants the home network, a mode switching to manual mode is effected as discussed above.

If on the other hand the user indicates that the home network is not wanted, the foreign network (secondary network) is selected. This question is only asked once which means that as long as the telephone is activated (power on) this question is only posed once so that if the user has indicated that he accepts to be connected to a secondary or a foreign network this is "remembered" i.e. stored within the logical unit temporarily. If the search for the home network is continued, and if the home network is found, advantageously the question "home" is only asked once. In one embodiment the question may be made again, but the reply to it from the user is not valid, i.e. it does not matter whether he answers yes or no if the given number of times for asking the question during an activation period has already been reached. If the international network is lost, a check is done to see if any other network can be found, and if so, such is selected. If on the other hand no other network but only the home network is found, this is automatically selected and an automatic switching from automatic to manual mode is carried out.

The way of interacting with the user can of course be put into practice in a number of different ways, different questions can be used, it is also possible to form the interaction means in such a way that any desired kind of replying to a question or similar can be constructed. It is also possible to arrange one or more primary and secondary networks respectively according to some priority table, list or similar.

Figure 2:
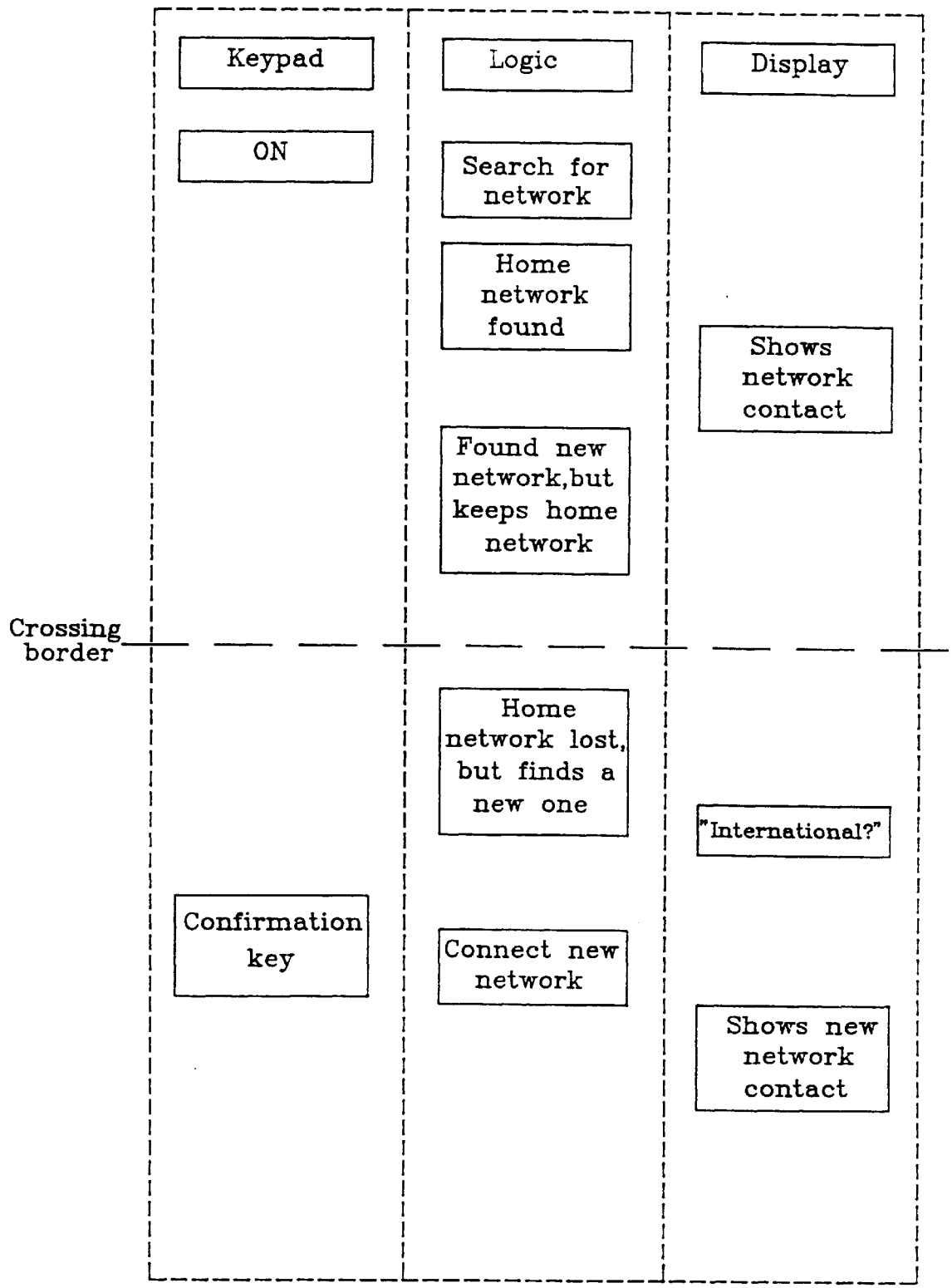

FIG. 2 illustrates in a schematical way three different units of a mobile communication unit (here a telephone). The different units comprise a keypad for switching on and off the telephone and keys or buttons for user interaction. The logical unit is responsible for searching for network(s), connecting to a network etc. The logical unit receives information and also checks the radio part for transmitting, receiving and measuring on different frequencies, i.e. searching network, found network, lost network etc. On the display unit can for example be illustrated the presence of network contact, the questions for the user can be displayed in a text mode thereon etc.

In FIG. 2 is illustrated one example of how a telephone functions when it is in manual mode and the telephone is switched on in the home country. If the button "on" at the keypad is pressed, the telephone is switched on. Via the logical unit a search is done for the network in a manner known per se and if the home network is found, it is shown on the display unit that network contact has been established. If via the logical unit another network is found, the home network is kept if the telephone is still in contact with it. The dashed line in the figure intends to illustrate that the user crosses a border, i.e. he goes from one country to another. It may then occur that the home network is lost. If via the logical unit another network is found, there is a need for interaction with the user. On the display the text can be seen: "international?". If the user accepts to be connected to a foreign network, he confirms by pressing a key, i.e. the answer is yes. Via the logical unit connection is established with the new network in a manner known per se. On the display is then indicated that network contact is established with a new network in any convenient way.

Naturally the home network and the foreign network referred to above can be exchanged through a primary network and a secondary network, for example, networks of different operators within one and the same country. In that case, of course, the questions to the user when interaction is needed can be formulated differently such as for example "primary network?" and "secondary networks?". Of course any other alternative is possible.

The invention also relates to mobile communication units, particularly telephones, which can be used on more than one system standard, i.e. dual mode telephones.

One and the same telephone can then be used e.g. in PCN-DCS1800 and GSM (Groupe Special Mobile) or in AMPS and D-AMPS, GSM and NMT etc. The problems and solutions as discussed above in relation to network selection, are the same also for change between standards. Still further the same principles apply for telephones which operate in dual mode in that they can use different frequency bands, c.f. TACS (Total Access Communication System). Thus, what differs from the above detailed description relating to networks is that the questions to the user should be different, i.e. they might read "Primary System?", "Secondary Systems?", "Primary frequency band?", "Secondary frequency bands?" etc.

There may also be more other questions etc. In a particular embodiment relating to system selection, the option may be provided to connect via satellite. This is to date extremely expensive, but it could be used for emergency situations. Of course it can also be seen simply as a further option. Then for example a question may be asked like "Satellite?". It may for example be possible to select between GSM, PCN, and satellite.

The invention also relates to a mobile communication system in which the mobile telephones are compatible with at least two different networks within the system which may be run by different operators etc. Alternatively the mobile telephones are compatible with one or more system standards such as e.g. AMPS and D-AMPS, NMT and GSM, PCN-DCS1800 and GSM etc. of which one forms a primary system and another a secondary etc. The invention moreover relates to a mobile communication system wherein the mobile telephones can be used in different frequency bands.

What is claimed is:

1. A mobile communication unit comprising means for activating the mobile communication unit, a logical arrangement, wherein the logical arrangement comprises:

searching and connecting means for searching and connecting to a communication arrangement, the unit having at least two modes of which at least one is an automatic search mode, the unit being compatible with at least two communication arrangements of which at least one is a primary communication arrangement, and the primary communication arrangement being automatically connected if the primary communication arrangement is found and the unit is in the automatic search mode, and means for interaction with a user for accepting and/or rejecting a found communication arrangement, wherein if the mobile communication unit is in a manual mode and the primary communication arrangement is not found, the user is asked a limited number of times if a secondary communication arrangement can be selected via the user interaction means, and the secondary communication arrangement is selected if the user indicates via the interaction means that the secondary communication arrangement is acceptable.

2. Mobile communication unit according to claim 1, further comprising information means for providing a user with information that arrangement contact is established.

3. Mobile communication unit according to claim 1, wherein a first mode is a manual mode and a second mode is the automatic search mode.

4. Mobile communication unit according to claim 1, wherein if the mobile communication unit is activated and if the primary arrangement is found, the primary arrangement is automatically selected.

5. Mobile communication unit according to claim 1, wherein if the mobile communication unit is activated and it is in an automatic or a manual mode and the primary arrangement is found, this is automatically selected.

6. Mobile communication unit according to claim 1, wherein if the mobile communication unit is in a manual mode and the primary arrangement is not found, the user is asked a given number of times if a secondary arrangement can be selected via the user interaction means.

7. Mobile communication unit according to claim 1, wherein if the communication unit is active in a manual mode and a primary arrangement is lost, the user is asked a given number of times if a secondary arrangement can be selected.

8. Mobile communication unit according to claim 6, wherein the user is asked if a secondary arrangement can be selected a limited number of times.

9. Mobile communication unit according to claim 8, wherein the user is asked if a secondary arrangement can be selected once per activation period of the mobile communication unit.

10. Mobile communication unit according to claim 6, wherein if an acceptance indication of a secondary arrangement has been given, an automatic mode switching occurs from a first mode to the automatic mode.

11. Mobile communication unit according to claim 1, wherein if only a primary arrangement is found, this is selected without requiring user interaction independently of whether the unit it in a manual or in an automatic mode.

12. Mobile communication unit according to claim 11, wherein if the communication unit is in the automatic mode, an automatic switching to the manual mode occurs and the primary arrangement is selected and connected to.

13. Mobile communication unit according to claim 1, wherein if a secondary arrangement is selected or if a secondary arrangement is not given an acceptance indication, a continuous search for a primary arrangement is done.

14. Mobile communication unit according to claim 13, wherein if it is in an automatic mode and a primary arrangement is found when connected to a secondary arrangement, the user is asked a given number of times during the activation period of the mobile communication unit if the primary arrangement should be selected.

15. Mobile communication unit according to claim 1, wherein if the unit is in an automatic mode and if only one arrangement is found, this arrangement is automatically selected and is indicated to the user.

16. Mobile communication unit according to claim 1, wherein if the communication unit is in an automatic mode and if at least a primary arrangement and a secondary arrangement are found, the user is via the interaction means asked to state the arrangement to selected.

17. Mobile communication unit according to claim 16, wherein the user is asked a given number of times during each activation period of the mobile communication unit to state whether the primary arrangement is to be selected, and if yes, an automatic switching to the manual mode is carried out.

18. Mobile communication unit according to claim 17, wherein the user is asked to interact a limited number of times during each activation period, for example only once per activation period.

19. Mobile communication unit according to claim 1, wherein if the unit is in the automatic mode and a secondary arrangement having been selected is lost and only a primary arrangement is found, this is automatically selected.

20. Mobile communication unit according to claim 1, wherein if a connection is established to a secondary arrangement, a continuous search is performed for finding a primary arrangement and if such is found, user interaction is required for deciding which arrangement to proceed with.

21. Mobile communication unit according to claim 1, wherein the primary and secondary arrangements relate to primary and secondary networks respectively.

22. Mobile communication unit according to claim 21, wherein at least one primary and one secondary network are located within one and the same country.

23. A mobile communication unit according to claim 21, wherein a primary network is a home network and a secondary network is a foreign network.

24. Mobile communication unit according to claim 1, wherein the primary and secondary arrangements relate to systems of at least a primary and secondary standard respectively, the mobile communication unit being a multi-mode device.

25. Mobile communication unit according to claim 1, wherein the primary and secondary arrangements relate to primary and secondary frequency bands respectively.

26. Mobile communication unit according to claim 1, wherein the interaction means comprises a display and a keypad.

27. A method for selecting a communication arrangement for a mobile communication unit having user interaction means comprising the steps of:

searching for communication arrangements accessible to the mobile communication unit;

examining if any primary communication arrangement is found;

if a primary communication arrangement is found, then automatically selecting the primary communication arrangement;

if a primary communication arrangement is not found, then, via the interaction means asking the user to enter an input that indicates if selection of a secondary communication arrangement is acceptable;

if the user input indicates that a secondary communication arrangement is acceptable, then selecting a secondary communication arrangement;

if the user input indicates that a secondary communication arrangement is not acceptable, continuing to search for a primary communication arrangement.

28. Method according to claim 27, wherein interaction with a user only takes place a limited number of times per mode during an activation period of the mobile communication unit.

29. Method according to claim 27, wherein the mobile communication unit comprises at least two modes of which at least one is automatic, further comprising the steps of automatically switching between the modes if only a primary arrangement is found while in automatic mode in which case switching is done to manual mode, and selection of the primary arrangement is done, whereas if both a primary and a secondary arrangement are found, the user is inquired via user interaction means;

no primary network is found when in manual mode, in which case the user is inquired whether he agrees to searching for a secondary arrangement, if yes switching occurs automatically to the automatic mode and the secondary arrangement is selected.

30. Method according to claim 27, wherein the primary and secondary arrangements relate to primary and secondary networks respectively.

31. Method according to claim 27, wherein the primary and secondary arrangements relate to primary and secondary systems of different standards respectively.

32. Method according to claim 27, wherein the primary and secondary arrangements relate to primary and secondary frequency bands respectively.

33. A mobile communication unit adapted to be compatible with at least two communication networks having different communication arrangements, one of which is a primary arrangement, comprising:

means for activating the mobile communication unit;

a logic unit comprising:

means for searching for communication networks, the searching means having at least two modes of operation including an automatic search mode and a manual search mode;

means for interacting with a user for accepting and/or rejecting a found communication network; and means for connecting to a communication network;

wherein, when the mobile communication unit is active in manual mode and a primary arrangement is not found, the means for interacting with a user asks a limited number of times if a second communication arrangement can be selected.

34. A mobile communication unit according to claim 33, wherein:

the means for interacting with a user asks once per activation period if a second communication arrangement can be selected.

35. A mobile communication unit according to claim 33, wherein:

if the user indicates that a secondary communication arrangement has been accepted, then the searching means switches from a manual search mode to an automatic search mode.

\* \* \* \* \*